United States Patent
Ta et al.

(10) Patent No.: US 6,720,749 B2
(45) Date of Patent: Apr. 13, 2004

(54) THREE-PHASE MOTOR PROTECTOR APPARATUS

(75) Inventors: Timmy M. Ta, Johnston, RI (US); Marc P. Dupre, Singapore (SG)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/256,574

(22) Filed: Sep. 27, 2002

(65) Prior Publication Data

US 2003/0071591 A1 Apr. 17, 2003

Related U.S. Application Data

(60) Provisional application No. 60/327,044, filed on Oct. 4, 2001.

(51) Int. Cl.⁷ .............................. H02P 7/00; H02H 3/26; G01R 25/00
(52) U.S. Cl. ....................... 318/434; 318/453; 318/782; 318/798; 318/806; 361/31; 361/76; 361/77; 361/93.6; 361/47; 324/521; 324/76.52; 324/76.77
(58) Field of Search ................................ 318/434, 432, 318/453, 454, 496, 771, 782, 798, 806; 361/24, 31, 76, 77, 78, 85, 87, 93.6, 47; 324/244, 521, 522, 76.52, 76.77, 86; 323/274, 277, 284

(56) References Cited

U.S. PATENT DOCUMENTS

| | | | | |
|---|---|---|---|---|
| 4,683,513 A | * | 7/1987 | Miller | .......................... 361/76 |
| 5,570,258 A | | 10/1996 | Manning | |
| 5,815,357 A | * | 9/1998 | Innes et al. | ................. 361/93.6 |
| 5,896,257 A | * | 4/1999 | Takahashi | ..................... 361/31 |
| 6,593,714 B2 | * | 7/2003 | Nagayama | .................. 318/254 |

FOREIGN PATENT DOCUMENTS

| | | | | | |
|---|---|---|---|---|---|
| EP | 559526 A1 | * | 9/1993 | .......... | H02H/07/09 |
| GB | 2035728 A | * | 6/1980 | .......... | G01R/29/16 |
| JP | 61177192 A | * | 8/1986 | .......... | H02P/07/63 |
| JP | 01222685 A | * | 9/1989 | .......... | H02P/06/00 |
| JP | 02250697 A | * | 10/1990 | .......... | H02P/07/36 |

* cited by examiner

*Primary Examiner*—Robert Nappi
*Assistant Examiner*—Edgardo San Martin
(74) *Attorney, Agent, or Firm*—Frederick J. Telecky, Jr.; Russell E. Baumann

(57) ABSTRACT

A three-phase motor protector uses two toroids to monitor all three phases of a three-phase motor. Current and phase loss are monitored directly in phases A and B while the phase C current level is determined by analysis of the phase A and B relationship. Current is induced into the phase A and B toroids from the motor supply lines with the resulting wave fed to an input of high-gain inverting amplifiers to provide A and B square waves which are inputted to separate channels of a microprocessor (U3). The square waves are processed by an AND gate providing an output square wave with a 16.66 percent duty cycle for normal operation. Upon loss of phase C the ANDed result is a digital low since the individual waves of phases A and B become an inverse of one another. In order to prevent nuisance tripping an AND output of less than 2 percent duty cycle is treated as a phase loss. The protector also includes a thermal overload protection network (T6-S2), current overload protection (U1A, U1B), low pressure protection (U2), voltage monitoring (U4), motor size selection (U1C) among other features.

9 Claims, 5 Drawing Sheets

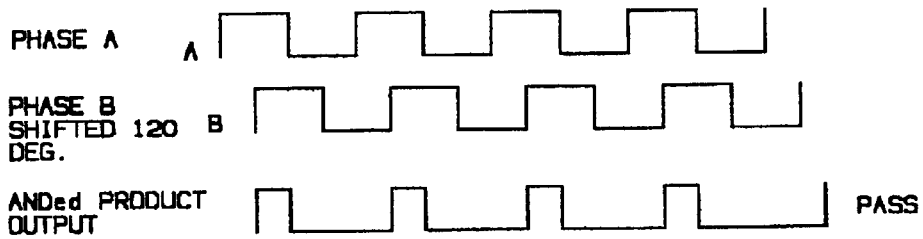
FIG. 5(a)
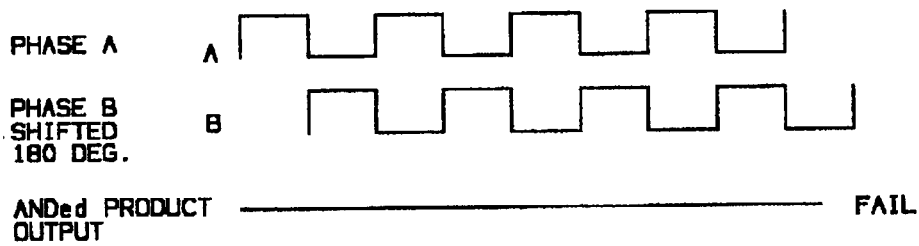
FIG. 5(b)
FIG. 5(c)

THREE-PHASE MOTOR PROTECTOR APPARATUS

Benefit is claimed under 35 U.S.C. Section 119(e) (1) of U.S. Provisional Application No. 60/327,044, filed Oct. 4, 2001.

FIELD OF THE INVENTION

This invention relates generally to three-phase motors and more particularly to apparatus for preventing damage to such motors and loads driven by such motors upon miswiring of the motor or otherwise losing a phase during normal operation.

BACKGROUND OF THE INVENTION

In a three-phase system, each phase is separated from the following phase by 120°. If the first phase is designated "A", the second phase, or "B" will peak 120° after "A" has done so. In turn, the third phase "C" will peak 120° after "B", and 240° after "A". 120° after "C" has peaked, "A" will peak once again, completing the "circle" at 360° from "A" to "A".

A three-phase electric motor requires this 120° phase-sequence to operate efficiently. The loss of a single phase would cause motor current and, in turn, temperature to rise dramatically. Such a loss could also cause excessive mechanical vibrations within the motor itself. These vibrations could be transmitted to whatever is being driven by the motor, such as a compressor. In any case, a single-phase loss could result in severe motor damage and possible compressor damage, as well.

Such a situation can be avoided by providing a protection scheme in which a single-phase loss would result in all power being cut to the motor. The use of a dedicated electronic motor protection device is a common means to this end. A control unit within this type of protector monitors the three phases in an electric motor, and determines if a fault condition exists. There are several methods by which the three phases can be coupled to the control unit. However, utilizing current toroids as sensors has gained favor within the industry. Current toroids isolate the control unit from a direct electrical connection with the high voltage of an electrical motor. The output signals generated by this type of sensor can easily be interpreted, as well. This allows the protector to respond to other failure modes beyond phase loss. Such additional features are important in an effective motor protector.

A primary disadvantage of using current toroids in a design is cost. The assembly process needed to ensure consistency of electrical characteristics is complex. The core material in its raw form is relatively expensive, as well. A typical three-phase protection module uses a toroid for each phase. Three of these toroids can account for a large percentage of a completed module's production cost.

SUMMARY OF THE INVENTION

It is an object of the present invention to provide an effective, reliable three-phase motor protection module but one that is more economical than the prior art approach described above.

As noted above, each of the three waveforms in a three-phase motor is separated by 120°. A loss of one phase will change the relationship between the remaining two phases, each becoming an inverse of the other. In other words, they will be separated by 180°. This has been demonstrated by extensive testing utilizing a three-phase electric motor wired in a wye configuration coupled to a scroll compressor. Oscilloscope measurements show that the normal 120° relationship between the two remaining phases shifts to 180° within one cycle after a single-phase loss. Briefly, in accordance with the invention, two toroids are used to monitor a three-phase motor instead of the usual three. Motor current through phases A and B is monitored by a toroid assigned to each of those phases. Phase A or B current loss is directly detected in a conventional manner. However, Phase C has no toroid to monitor its current. In accordance with the invention, phase C loss is detected by indirect means, i.e., the phase relationship between "A" and "B".

Current is induced into the phase A and B toroids from the motor supply lines. Load resistors at the output of each toroid reduce the resulting sine wave to a manageable level. Each waveform is sent to an input of a high-gain, inverting amplifier section. The resulting inverted square wave outputs are much easier for the following logic circuits to interpret than the original sine wave. Both "A" and "B" square wave signals are then sent to separate channels of a micro-controller for evaluation with the phase relationship intact. The circuitry within the micro-controller compares the "A" and "B" signals by means of a firmware-encoded logic AND circuit. This AND-ed output is evaluated by the encoded firmware, as well.

In a normal-run situation, AND-ing both phases produces a square wave with a 16.66 percent duty cycle. This is because the 120° phase difference allows both inputs to overlap 16.66 percent of the time. Assuming no other faults are detected, the micro-controller allows the motor under its control to remain operational.

However, a phase C loss will change the 120° phase A-to-B relationship. In this situation, one phase becomes a "perfect" inverse to the other, a 180° difference. Therefore, the waveforms never overlap. The AND-ed result is a digital "low", 100 percent of the time. The micro-controller interprets this constant low as a phase C loss, opening the module relay, and therefore the motor contactor, after a predetermined time.

Since there is no such thing as perfect, from a practical standpoint, one must expect that a phase C loss will not result in an absolute 180° phase shift between "A" and "B". Even a small deviation from this relationship would cause "spikes" in the output of the AND circuit. This could result in delayed phase C loss detection, or no detection at all. The design firmware has been encoded to counteract this situation. An AND output that results in less than a two-percent duty cycle is treated as a phase loss. This ensures that small differences in electrical characteristics between the toroids, or among other circuit elements, will not prevent phase C loss detection.

The phase loss detection offered by the motor protector made in accordance with the invention will protect a motor wired in either a wye or delta configuration, where a single-phase loss would reduce the current paths from three to one. However, phase C loss in a wye system with a Neutral return, an uncommon configuration, would be undetectable by the motor protector.

BRIEF DESCRIPTION OF THE DRAWINGS

Other objects, advantages and details of the novel and improved protection apparatus of the invention appear in the following detailed description of the preferred embodiments, the detailed description referring to the drawings in which:

FIG. 5a is a timing diagram for phases A and B with the resulting AND-ed product output for normal operation of a motor in a wye or delta configuration;

FIG. 5b is a timing diagram similar to FIG. 5a but showing abnormal or loss of phase operation; and FIG. 5c is a timing diagram showing an output having glitches which are ignored by the control.

DETAILED DESCRIPTION OF PREFERRED EMBODIMENT

Figure 1:
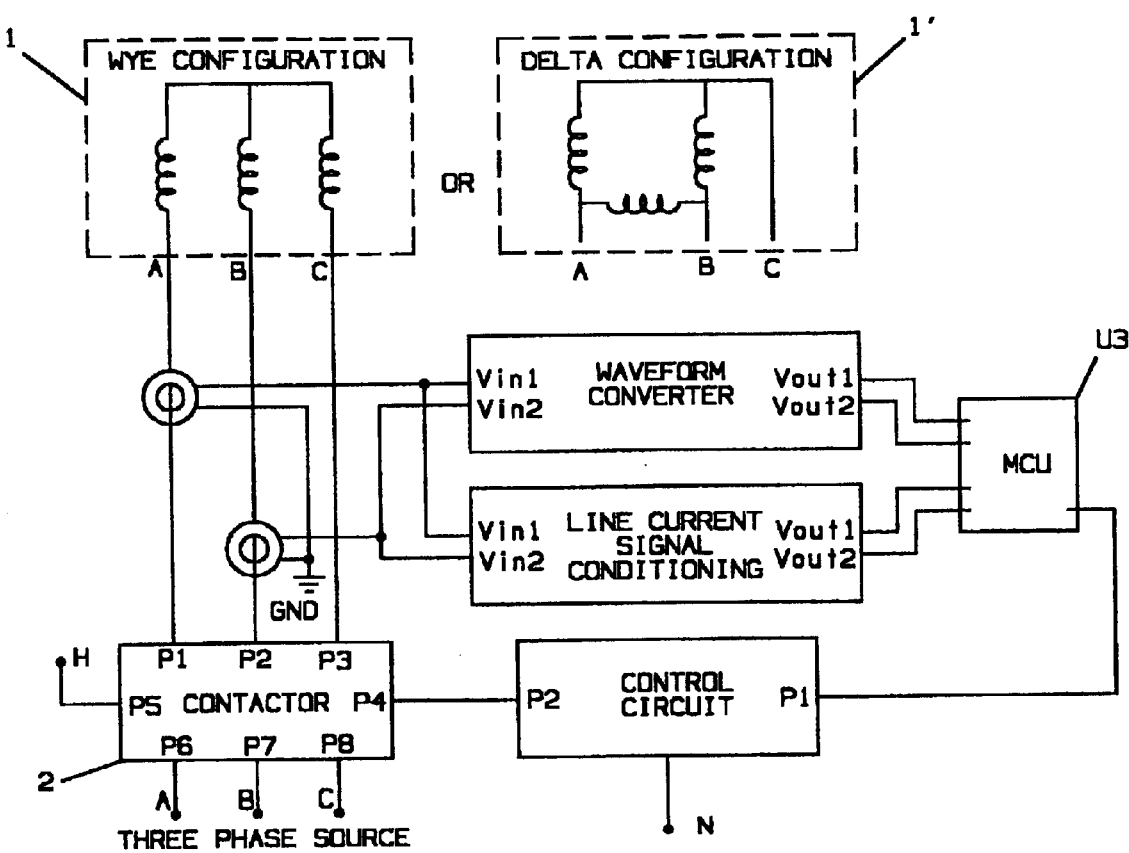
FIG. 1 is a block diagram showing a motor protection module made in accordance with the invention as used in a system having a wye or delta wired motor connected to a power supply through a contactor.

FIG. 1 is a schematic representation of a system comprising a wye configured three-phase motor 1 or alternatively a delta configured three-phase motor 1' having phases A, B and C coupled to a three-phase source through a contactor 2 shown with a motor protector made in accordance with the invention. The motor protector is shown to comprise a wave form converter and a line current signal conditioning portion interconnected with a microprocessor U3 which in turn is connected to the contactor through a control circuit. The motor protector is shown in detail in FIGS. 2 and 3, to be discussed below. In accordance with the invention, only phases A and B are provided with current sensing toroids, toroid 1, toroid 2. Although the motor protector is shown connected to wye configured motor 1, it will be understood that the delta configured motor 1' can be connected to the motor protector with the toroids arranged to sense current in phases A and B in the same manner as show.

Figure 2:
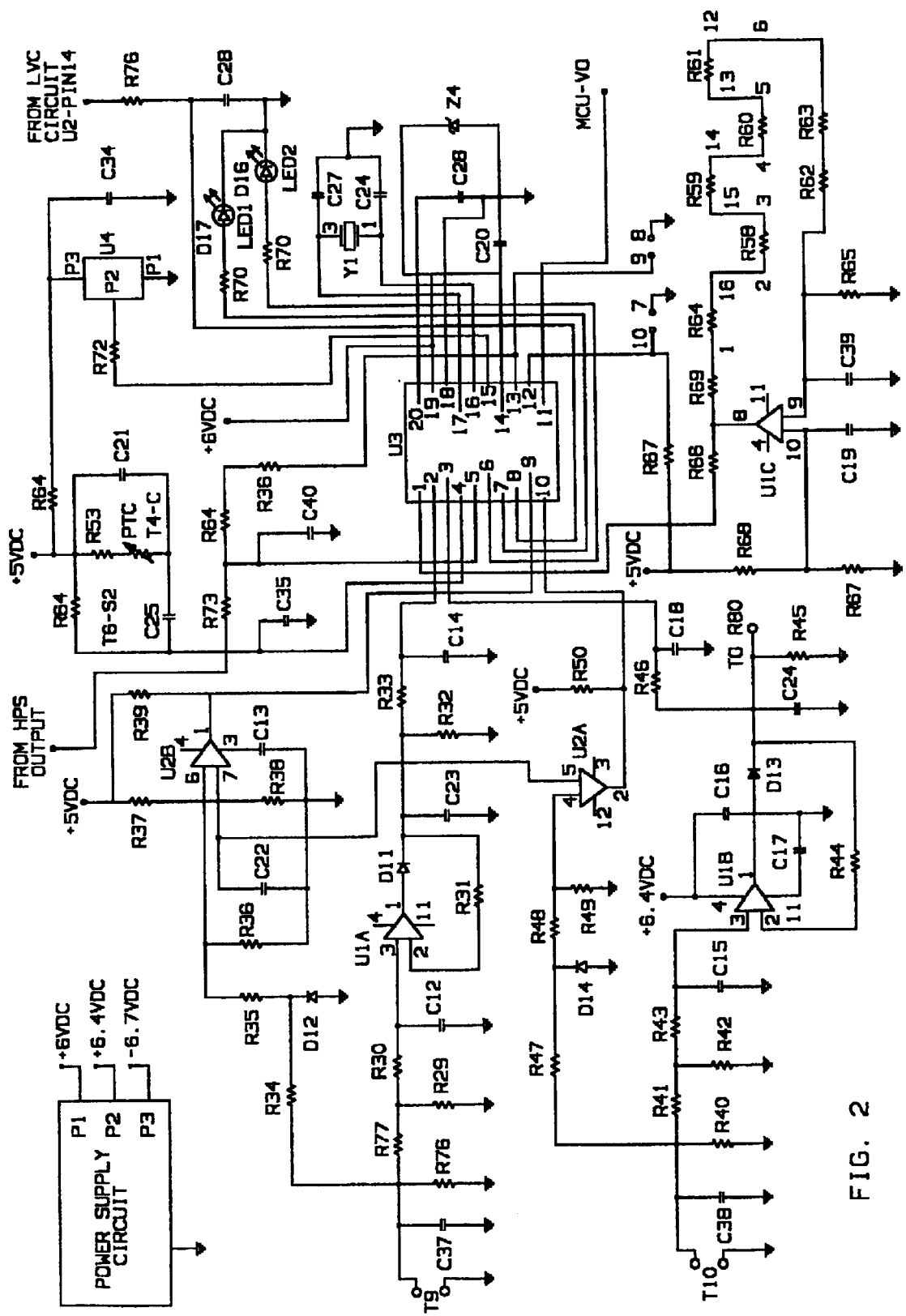
FIG. 2 is a schematic wiring diagram of the control portion of the motor protection module made according to a preferred embodiment of the invention.

With respect to FIG. 2, T9, T10 are connected to toroids 1 and 2 for phase A and B respectively and serve as inputs to the motor protector circuit. Circuitry for each channel between the inputs and microprocessor U3 is identical and as components in the T9 channel are identified, corresponding components in the T10 channel will be indicated in parenthesis. Capacitor C37 (C36) connected between the high side of T9 and ground is a filter capacitor and resistor R76 (R40) is a load resistor connected to the toroid to prevent excessive voltage and possible damage to the toroid. A voltage divider network comprising resistors R77 and R29 (R41 and R42) is connected in the channel beyond the load resistor to reduce the signal to a selected voltage which is then fed through current limiting resistor R30 (R43) to a line current signal conditioning portion noted in FIG. 1 comprising a high gain inverting operational amplifier U1A (U1B) which is as a peak detector circuit with the peak of the AC sine wave being converted to DC at that amplitude. This circuit serves as a motor current monitor. Resistor R31 (R44) connected between the output and the negative input is a feedback resistor. Capacitor C12 (C15) connected between the positive input and ground is a filter capacitor. The non-inverted sine wave output goes through diode D11 (D13) to rectify the negative half of the signal. Capacitor C23 (C24) and resistor R32 (R45) serve as an RC filter network as do capacitor C14 (C18) and resistor R33 (R46). The filtered signal is then fed to input 2 (3) of microprocessor U3. The microprocessor includes an internal AND gate network for adding the signals from the two channels and determines the separation between phases A and B, to be discussed below.

Comparator U2B (U2A) functions as a wave form converter, also noted in FIG. 1, converting the toroid output to a square wave. Resistor R34 (R47) is a current limiting resistor and resistors R35, R36 (R48, R49) form a voltage divider to scale down the voltage. The junction of the voltage divider is inputted to the negative pin of the comparator. Diode D12 (D14) provides protection from spikes. The junction of resistors R37, R38 which are connected between +5 VDC and analog ground is connected to the positive pin of the comparator providing a reference voltage close to zero. Any signal received higher than the reference triggers the comparator to produce a square wave. Resistor R39 (R50) is a pull-up resistor and capacitor C13 is a filter capacitor. Thus a sine wave input of a certain frequency produces a square wave of the same frequency. This is inputted to pin 9 (10) of microprocessor U3 so that the microprocessor can directly determine if there is a phase loss in either phase A or phase B.

As noted above, the square wave output of square wave converter U2A, U2B, are inputted at pins 10 and 9 of microprocessor U3 into a logical AND gate network to determine the phase relationship between the phase A and phase B signals. When all three phases are operating in a normal manner the output of the AND gate is a square wave (see FIG. 5(a)) having a 16.66 percent duty cycle due to the 120° phase difference. Upon loss of phase C however, the relationship of phase A to phase B changes to 180° (see FIG. 5(b)) with the output of the AND gate being a continuing digital low. This is interpreted by the microprocessor as a phase loss and after a selected time will de-energize the module relay K1, to be discussed. In order to prevent nuisance tripping caused by small deviations from the normal 120° phase relationship which could cause spikes in the output of the AND gate the microprocessor uses a 2 percent duty cycle as a threshold so that any output of the AND gate having a less than 2 percent duty cycle (see FIG. 5(c)) is considered as a phase loss.

The control circuit also includes a thermal overload protection feature T6-S2 which utilizes a PTC element embedded in a motor winding. Resistor R51 and the serial combination of resistors R53 and the PTC element form a voltage divider the junction of which is connected to pin 4 of the microprocessor through current limiting resistor R52. Capacitors C25 and C21 are filter capacitors. The output of the thermal overload provides an analog form of voltage from zero to close to 5 volts. The microprocessor compares the voltage to a threshold to determine whether an overload has occurred.

Voltage supervisor U4, a conventional three pin device, monitors the +5 volt supply. Pin P3 of supervisor U4 is connected to the +5 VDC supply with filter capacitor C34 tied to analog ground and pin P2 connected to pin 15 of microprocessor U3 through resistor R72. Should the supply voltage drop to a preselected level a signal is sent to the microprocessor to shut down the circuit.

Light emitting diodes LED1 (D17) and LED2 (D18) are connected though current limiting resistors R70, R71 to pin 7 and 6 respectively of microprocessor U3 and provide a visual indication of the operational status. A selected code is employed utilizing a green LED (D17) and/or red LED (D18) for normal operation (green), existence of an overload (red) and so on.

An oscillator network employing crystal Y1 and capacitors C26, C27 connected to pins 16, 17 of microprocessor U3 provides the clock signal for the microprocessor.

Zener diode Z4 is used as a surge suppressor and capacitors C20, C28 are filter capacitors for vcc, pin 19 of microprocessor U3.

Operational amplifier U1C is used in a digital to analog converter circuit for providing a range of motor size selections. The circuit is a ladder network including resistors R58–R64 and DIP switch points 1–16. The positive pin of operational amplifier U1C is connected between resistors R67, R68, in turn connected between the +5 VDC supply and analog ground to provide a reference voltage. The position of the bit switch will determine which of several different output voltages is produced at pin 8 of the operational amplifier by varying the effective resistance between pins 9 and 8 of the amplifier. For example, pins 1 and 16 will bypass resistor R64 to reduce the gain of the amplifier and result in a particular output voltage. Output pin 8 of operational amplifier is connected between the ladder resistors and resistor R66 which in turn is connected to pin 1 of the microprocessor.

Figure 3:
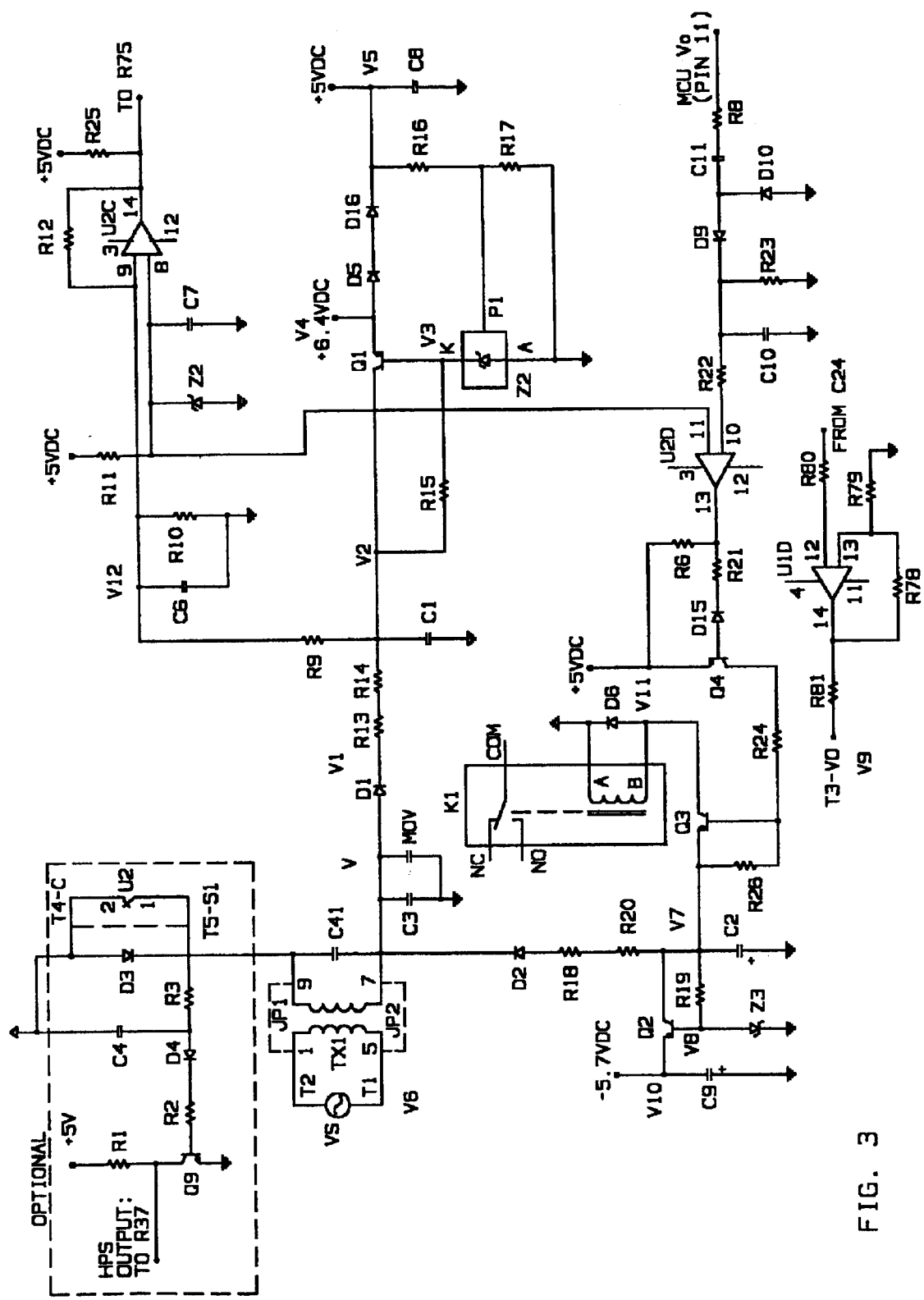
FIG. 3 is a schematic wiring diagram of the power supply portion of the motor protection module made according to a preferred embodiment of the invention.

With respect to FIG. 3, TX1 is a step down transformer, for example, a 115 VAC primary and a 24 VAC secondary. Jumpers JP1, JP2, are shown for optional use to bypass the transformer, for example when a 24 VAC supply is provided. Capacitors C41 and C3 are line filter capacitors and a varistor MOV is provided for surge suppression. Diode D1 is a positive half wave rectifier converting ac voltage V to a positive half wave voltage V1. Diode D1 is connected to current limiting resistors R13, R14 and capacitor C1 is used to filter the signal.

Comparator U2C is used to monitor the output of the transformer. If the voltage goes too low, e.g., less than 15 VAC, then the comparator will send a signal to microprocessor U3 pin 8 through resistor R75. Resistors R9, R10 form a voltage divider and capacitor C6 is a filter capacitor providing a voltage V12 at the junction of the divider. This is inputted to the positive pin of comparator U2C. Zener diode Z2 provides a reference voltage of 2.2 volts for the negative pin of the comparator. Resistor R11 connected between the +5 VDC supply and the C7 is a filter capacitor. Resistor R12 is a feedback resistor providing a selected hysteresis for the comparator circuit and resistor R25 connected between the +5 VDC supply and the output of comparator U2C is a pull-up resistor.

NPN transistor Q1 and precision voltage regulator Z1 connected to the base of transistor Q1 function as a programmable zener for controlling the output of the circuit. The junction of resistors R16, R17 serially connected between V5 and analog ground and feeds to reference pin REF of regulator Z1 to produce a programmed +5 VDC supply. Diodes D6 and D16 connected to the emitter of transistor Q1 (V4) provide a voltage gain of approximately 1.4 volts at the emitter voltage V4 of 6.4 VDC with respect to 5.0 VDC at V5. Resistor R15 connected between the base and collector of the transistor is a current limiting resistor for the zener diode.

Comparator U2D serves as a control circuit for turning relay K1 on and off depending on the controlling input signal from pin 11 of microprocessor U3. The microprocessor produces a square wave of approximately 488 hertz. This type of output of the microprocessor, i.e., a signal with a selected hertz rate is required to keep relay K1 on. If, for example, an electrostatic discharge (ESD) were to be injected into the circuit, the microprocessor may be disabled with the signal at pin 11 either high or low. In either case, relay K1 will be de-energized. Zener Z2 provides a reference of approximately 2.2 volts for both comparators U2C and U2D. Capacitor C11 in the line from the microprocessor allows only high frequency AC signal to pass. Diode D9 filters the negative half of the signal while diode D10 provides surge protection. Resistor R23 and capacitor C10 form an RC network. When a signal is present, pin 10 of comparator U2D will be higher than pin 11 and turn on transistor Q4 which triggers transistor Q3 in turn turning on relay K1.

V10 denotes a negative voltage. Diode D2, connected to the secondary of transformer TX1, rectifies the positive half of the sine wave from the transformer. Resistors R18, R20 are current limiting resistors. Zener Z3 is a 6.2 volt device connected between the base of PNP transistor Q2 and analog ground to ground to control the output voltage at −5.7 volts. Resistor R19 is a current limiting resistor and capacitor C2 is a filter capacitor.

The output of operational amplifier U1D, whose positive input pin is connected to capacitor C24 to produce a linearly proportional from 0 to 5 VDC output, to correspond to motor current of 0 to 180 amps full range.

Also shown in FIG. 3 is an optional circuit portion used with a high pressure switch U2 mounted in a compressor. Diode D3 is tied to ground. A selected pressure level is required for closing the pressure switch. Points for connecting the high pressure switch (U2) are indicated at T4 and T5. When switch U2 is closed indicative of adequate pressure a ground path to the transformer is formed. When the switch is open, current flows through half wave rectifier D3 turning on transistor Q9, switching the output at the collector of Q9 to a digital low voltage level. Resistor R3 is a current limiting resistor and capacitor C4 is a filter capacitor. When switch U2 closes, transistor Q9 turns off with the output point at the collector of Q9 switching to high at +5 volts. The output of transistor Q9 is connected to microprocessor U3 (through resistor R73) to provide a status signal thereto.

Figure 4:
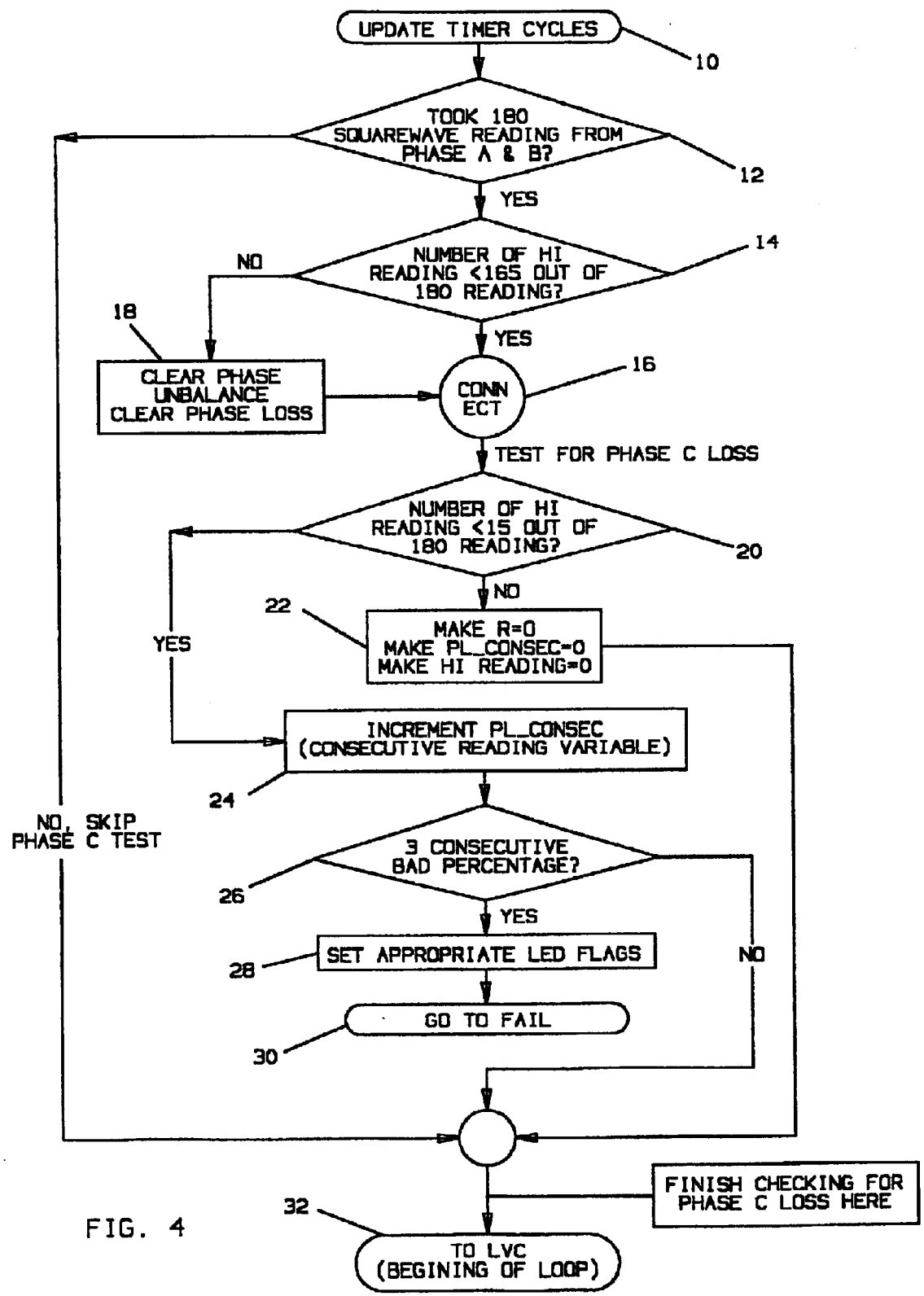
FIG. 4 is a flow chart showing process and decision steps associated with phase C loss detection.

As discussed above, in testing for phase C loss, the square waves are sampled at a frequency of 488 hertz. Thus at 60 hertz approximately 8 samples are taken per cycle and 180 readings are taken. The inputs are ANDed together and the number is compared to the expected number. If the number is low then a phase loss has occurred. With reference to FIG. 4, which shows the software routine for this testing, after updating timer cycles at the initiation 10 a decision step 12 determines whether 180 square wave readings were taken from phases A and B. If not, the routine skips the phase C test and jumps ahead to step 32 and back to the beginning of the loop at 10. If the decision of step 12 is positive, the routine goes to decision step 14 which determines whether the number of high readings is less than 165 out of 180 readings. A positive response results in the routine going on to 16 and a negative answer results in process step 18 of clearing the phase unbalance and phase loss registers and then going on to 16.

Following 16 a test is performed for phase C loss with decision step 20 determining whether the number of high readings is less than 15 out of 180 readings. High outputs of the ANDed samples are incremented to a register to determine the number of ANDed high readings. If the ANDed high readings are not less than 15 the routine goes to process step 22 in which the registers are reset, checking for phase C loss and the routine goes on to 32 and back to the beginning of the routine at 10. If the decision of step 20 is positive routine goes to process step 24 in which the consecutive reading variable register indicative of phase loss is incremented. The routine then goes to decision step 26 which looks to see of three consecutive bad percentage results. Upon a negative answer, checking for phase C loss is ended and the routine goes on to 32 and the beginning of routine at step 10. A positive response to the step 26 decision step result in setting of appropriate LED flags at step 28 and on to fail at step 30.

A motor protector made in accordance with FIGS. 2 and 3 comprised the following components:

| R | (ohms) |
|---|---|
| R1 | 4.87K |
| R2 | 10K |
| R3 | 200K |
| R5 | 4.87K |
| R8 | 1K |
| R9 | 30.1K |
| R10 | 10.5K |
| R11 | 49.9K |
| R12 | 100K |
| R13 | 26.1K |
| R14 | 26.1K |
| R15 | 470 |
| R16 | 24.9K |
| R17 | 24.9K |
| R18 | 26.1K |
| R19 | 1.5K |
| R20 | 26.1K |
| R21 | 10K |
| R22 | 10K |
| R23 | 102K |
| R24 | 10K |
| R25 | 10K |
| R26 | 100K |
| R29 | 14.3K |
| R30 | 10K |
| R31 | 10K |
| R32 | 412K |
| R33 | 10K |
| R34 | 4.87K |
| R35 | 4.87K |
| R36 | 102K |
| R37 | 412K |
| R38 | 1K |
| R39 | 4.87K |
| R40 | 49.9 |
| R41 | 10K |
| R42 | 14.3K |
| R43 | 10K |
| R44 | 10K |
| R45 | 412K |
| R46 | 10K |
| R47 | 4.87K |
| R48 | 4.87K |
| R49 | 102K |
| R50 | 4.87K |
| R51 | 10K |
| R52 | 100K |
| R53 | 1K |
| R54 | 10K |
| R55 | 10K |
| R57 | 10K |
| R58 | 2.49K |
| R59 | 4.99K |
| R60 | 10K |
| R61 | 20K |
| R62 | 20K |
| R63 | 20K |
| R64 | 1.24K |
| R65 | 1.5K |
| R66 | 10K |
| R67 | 1.24K |
| R68 | 100K |
| R69 | 3.01K |
| R70 | 1K |
| R71 | 1K |
| R72 | 4.87K |
| R73 | 10K |
| R75 | 10K |
| R76 | 49.9 |

-continued

| | |
|---|---|
| R77 | 10K |
| R78 | 30.1K |
| R79 | 10K |
| R80 | 100K |
| R81 | 240 |
| D1 | IN4004 |
| D2 | IN4004 |
| D3 | IN4004 |
| D4 | IN4148 |
| D5 | IN4148 |
| D6 | IN4148 |
| D9 | IN4148 |
| D10 | IN4148 |
| D11 | IN4148 |
| D12 | IN4148 |
| D13 | IN4148 |
| D14 | IN4148 |
| D15 | IN4148 |
| D16 | IN4148 |
| D17 | LED1 |
| D18 | LED2 |
| C1 | 470 uf |
| C2 | 470 uf |
| C3 | 0.1 uf |
| C4 | 0.47 uf |
| C6 | 0.1 uf |
| C7 | 0.1 uf |
| C8 | 10 uf |
| C9 | 10 uf |
| C10 | 0.1 uf |
| C11 | 0.1 uf |
| C12 | 0.1 uf |
| C13 | 0.1 uf |
| C14 | 0.1 uf |
| C15 | 0.1 uf |
| C16 | 0.1 uf |
| C17 | 0.1 uf |
| C18 | 0.1 uf |
| C19 | 0.1 uf |
| C20 | 0.1 uf |
| C21 | 0.1 uf |
| C22 | 0.1 uf |
| C23 | 2.2 uf |
| C24 | 2.2 uf |
| C25 | 2.2 uf |
| C26 | 18 pf |
| C27 | 18 pf |
| C28 | 0.22 uf |
| C29 | 0.47 uf |
| C34 | 0.1 uf |
| C35 | 0.1 uf |
| C36 | 0.47 uf |
| C37 | 0.1 uf |
| C38 | 0.1 uf |
| C39 | 0.1 uf |
| C40 | 0.1 uf |
| C41 | 0.1 uf |
| Z1 | TL431ILP |
| Z2 | 2.2 v |
| Z3 | 6.2 v |
| Z4 | TVS |
| Q1 | TIP31C |
| Q2 | Q2N5401 |
| Q3 | MPS3904 |
| Q4 | Q2N5401 |
| Q9 | MPS3904 |
| U1 | LM2902/MC |
| U2 | LM2901MX |
| U3 | MC68HC705JJ7 |
| U4 | TPS380915ODBVR |
| K1 | SPDT Relay |
| Y1 | Crystal |

Although the invention has been described with regard to a specific preferred embodiment thereof, many variations and modifications will become apparent to those skilled in the art. It is therefore the intention that the appended claims

What is claimed:

1. Motor protector apparatus for controlling the state of energization of a three-phase motor through a three-phase power source comprising:

first and second toroid current sensors for producing an AC sine wave corresponding to current in first and second power lines of the three-phase power source, a circuit having a 5V rail supply for converting the sine waves of the first and second toroid current sensors to separate square waves amplified close to the 5V rail supply voltage, a microprocessor, inputting the separate square waves to respective channels of the microprocessor for adding the two square waves to provide an ANDed square wave and determining the phase relationship between the two square waves as an indication of current in the third power line of the three-phase source, and a relay for causing energization and de-energization of the motor, the relay controlled by the microprocessor, the microprocessor de-energizing the relay when the duty cycle of the ANDed square wave is less than a selected value.

2. Motor protector apparatus according to claim 1 in which the selected value of the duty cycle is 2 percent.

3. Motor protector apparatus according to claim 1 in which the three-phase motor is one of a delta and a wye configured motor.

4. Motor protector apparatus according to claim 1 further comprising another circuit for converting the sine waves of the first and second toroid current sensors to an analog DC voltage level, and inputting the DC voltage to the microprocessor for directly monitoring the current level in the first and second phases of the motor to determine current overload.

5. Motor protector apparatus according to claim 1 further comprising a thermal overload circuit including a thermally responsive thermistor in heat transfer relationship with the three-phase motor and being connected to an input of the microprocessor.

6. Motor protector apparatus according to claim 1 further comprising a control circuit for controlling the energization of the relay, the control circuit including an operational amplifier having an input connected to the micorprocessor and an output connected to a transistor switch connected to the relay, the comparator turning on the transistor switch and in turn the relay only when the signal from the microprocessor is a square wave of at least a selected frequency.

7. A method for monitoring current flow in each phase of a three-phase motor comprising the steps of:

coupling a respective current sensing toroid to each of two power supply lines to the motor to provide first and second AC sine waves indicative of whether a phase loss has occurred in the two phase directly monitored, converting the first and second sine waves to first and second square waves and adding the first and second square waves together to produce an ANDed square wave, determining the duty cycle of the ANDed square wave, comparing the duty cycle of the ANDed square wave to a threshold related to a normally energized third phase, and de-energizing the motor if the duty cycle of the ANDed wave falls below the threshold a selected number of consecutive cycles.

8. A method according to claim 7 in which the threshold duty cycle is 2 percent.

9. A method according to claim 7 in which the motor is one of a delta and wye configuration.

* * * * *